United States Patent
Shen et al.

(10) Patent No.: US 10,292,163 B2
(45) Date of Patent: May 14, 2019

(54) METHODS AND SYSTEMS FOR BEAMFORMING FOR DEVICE-TO-DEVICE COMMUNICATION

(71) Applicants: Xuemin Shen, Waterloo (CA); Miao Wang, Hamilton (CA); Qinghua Shen, Waterloo (CA); Osama Aboul-Magd, Ottawa (CA); Yan Xin, Ottawa (CA); Kwok Shum Au, Ottawa (CA); Sheng Sun, Ottawa (CA)

(72) Inventors: Xuemin Shen, Waterloo (CA); Miao Wang, Hamilton (CA); Qinghua Shen, Waterloo (CA); Osama Aboul-Magd, Ottawa (CA); Yan Xin, Ottawa (CA); Kwok Shum Au, Ottawa (CA); Sheng Sun, Ottawa (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 170 days.

(21) Appl. No.: 15/360,756

(22) Filed: Nov. 23, 2016

(65) Prior Publication Data
US 2018/0146466 A1    May 24, 2018

(51) Int. Cl.
*H04W 72/04*    (2009.01)
*H04W 76/14*    (2018.01)
*H04W 84/12*    (2009.01)

(52) U.S. Cl.
CPC ....... *H04W 72/046* (2013.01); *H04W 72/042* (2013.01); *H04W 76/14* (2018.02); *H04W 72/0406* (2013.01); *H04W 84/12* (2013.01)

(58) Field of Classification Search
CPC ............................ H04W 76/14; H04W 84/12
See application file for complete search history.

(56) References Cited

U.S. PATENT DOCUMENTS

2017/0086211 A1*    3/2017    Sahin ................... H04W 74/04
2017/0353984 A1*    12/2017    Abdallah ............. H04B 7/0617

OTHER PUBLICATIONS

Shokri-Ghadikolaei, Hossein and Fischione, Carlo and Popovski, Petar and Zorzi, Michele, "Design aspects of short-range millimeter-wave networks: A MAC layer perspective," IEEE Network, vol. 30, No. 3, pp. 88-96, 2016.

(Continued)

*Primary Examiner* — Kent K Krueger

(57) ABSTRACT

Methods and systems for device-to-device (D2D) communication between a first device and a second device. The first device receives a communication transmitted by the second device, where the communication is intended for another recipient other than the first device. The communication provides information for the first device to determine a preferred transmit sector to be used by the second device for the D2D communication. The first device transmits a communication to the second device that provides information indentifying the preferred transmit sector to be used by the second device. As a receiver in the D2D communication, the first device receives data from the second device, transmitted on the preferred transmit sector. As a transmitter in the D2D communication, the first device transmits data to the second device on a preferred transmit sector identified in another communication received from the second device.

20 Claims, 13 Drawing Sheets

(56) References Cited

OTHER PUBLICATIONS

Rob, Sun and Yan, Xin and Jiamin, Chen and Hong, Li and Zhiming, Ding and George, Calcev, "NG60 Use Cases", IEEE 802.11-15/0328r4.
IEEE 802.11 working group and others, "IEEE 802.11 ad, Amendment 3: Enhancements for Very High Throughput in the 60 GHz Band," 2012.
Adhikary, Ansuman and Al Safadi, Ebrahim and Samimi, Mathew K and Wang, Rui and Caire, Giuseppe and Rappaport, Theodore S and Molisch, Andreas F, "Joint spatial division and multiplexing for mm-wave channels," IEEE Journal on Selected Areas in Communications, vol. 32, No. 6, pp. 1239-1255, 2014.

* cited by examiner

METHODS AND SYSTEMS FOR BEAMFORMING FOR DEVICE-TO-DEVICE COMMUNICATION

FIELD

The present disclosure relates to device-to-device communications, in particular the beamforming training used to establish device-to-device communications.

BACKGROUND

The IEEE 802.11ad standard has been proposed to support high definition (HD) multimedia and wireless docking station applications. Developments further to this standard have been proposed, including increasing the number of devices supported and supporting multiple device-to-device (D2D) communication links.

There is interest in supporting D2D traffic with heterogeneous quality of service (QoS) requirements, such as HD Video/Mass-Data Distribution, within the coverage of one primary connection point (PCP) or access point (AP). In particular, multiple users could have direct communication links between their devices, and these D2D links could have various QoS requirements, such as in terms of delay and throughput. Moreover, these D2D links could be from one device to multiple devices simultaneously. As a result, large amounts of traffic between user devices could coexist and may consume significant portion of the bandwidth.

Beamforming (BF) is the mechanism used for transceiver pairs to establish a communication link for communication. However, establishing multiple D2D communication links may pose challenges to the BF protocol design, particularly for wireless local area networks (WLAN) operating in 60 GHz millimeter waveband (mmWave) under directional multi-gigabit (DMG) mode. BF complexity increases linearly with the increase in number of antenna array of transmitters and receivers. Further, BF complexity increases with the increase of the number of devices and communication links. D2D communication links grow exponentially as of the number of devices in a network increases, leading to exponential growth rate of the BF complexity.

SUMMARY

In some examples described herein, the use of over-listening may enable a reduction in beamforming overhead for establishing D2D communication. Over-listening, in the present disclosure, refers to a ST obtaining information from a communication not intended for itself. In particular, a ST may over-listen to a sector sweep communication between another ST and an AP. Through this over-listening, the ST may determine the preferred transmit sector between another ST and itself.

In some examples, the present disclosure describes a method for D2D communication between a first device and a second device. The first device receives a first communication transmitted by the second device, where the first communication is intended for another recipient other than the first device. The first communication provides information for the first device to determine a preferred second device transmit sector to be used by the second device for the D2D communication. The first device transmits a second communication to the second device, the second communication providing information indentifying the preferred second device transmit sector to be used by the second device for the D2D communication. The first device engages in the D2D communication with the second device by performing at least one of: receiving data or transmitting data. When receiving data from the second device, the data is transmitted by the second device on the preferred second device transmit sector. When transmitting data to the second device, the data is transmitted by the first device on a preferred first device transmit sector identified in a third communication received from the second device.

In some examples, the present disclosure describes a first device for D2D communication with a second device. The first device includes a processing device executing instructions to cause the first device to receive a first communication transmitted by the second device, where the first communication is intended for another recipient other than the first device. The first communication provides information for the first device to determine a preferred second device transmit sector to be used by the second device for the D2D communication. The processing device further causes the first device to transmit a second communication to the second device, the second communication providing information indentifying the preferred second device transmit sector to be used by the second device for the D2D communication. The processing device further causes the first device to engage in the D2D communication with the second device by performing at least one of: receiving data or transmitting data. When receiving data from the second device, the data is transmitted by the second device on the preferred second device transmit sector. When transmitting data to the second device, the data is transmitted by the first device on a preferred first device transmit sector identified in a third communication received from the second device.

In some examples, the present disclosure describes a first device for D2D communication with a second device. The first device includes a software module to receive a first communication transmitted by the second device, where the first communication is intended for another recipient other than the first device. The first communication provides information for the first device to determine a preferred second device transmit sector to be used by the second device for the D2D communication. The first device further includes a software module to transmit a second communication to the second device, the second communication providing information indentifying the preferred second device transmit sector to be used by the second device for the D2D communication. The first device further includes a software module to engage in the D2D communication with the second device by performing at least one of: receiving data or transmitting data. When receiving data from the second device, the data is transmitted by the second device on the preferred second device transmit sector. When transmitting data to the second device, the data is transmitted by the first device on a preferred first device transmit sector identified in a third communication received from the second device.

In some examples, the present disclosure describes a computer readable medium comprising a memory storing thereon computer executable instructions for D2D communication between a first device and a second device. The instructions, when executed by the first device, cause the first device to receive a first communication transmitted by the second device, where the first communication is intended for another recipient other than the first device. The first communication provides information for the first device to determine a preferred second device transmit sector to be used by the second device for the D2D communication. The instructions, when executed, further cause the first device to transmit a second communication to the second device, the second communication providing information indentifying the preferred second device transmit sector to be used by the second device for the D2D communication. The instructions, when executed, further cause the first device to engage in the D2D communication with the second device by performing at least one of: receiving data or transmitting data. When receiving data from the second device, the data is transmitted by the second device on the preferred second device transmit sector. When transmitting data to the second device, the data is transmitted by the first device on a preferred first device transmit sector identified in a third communication received from the second device.

In some examples described herein, the first communication is a sector sweep (SSW) beacon transmitted by the second device to an access point (AP). The SSW beacon comprises a plurality of SSW frames, and each SSW frame provides information identifying a sector on which the SSW frame was transmitted.

In some examples described herein, the second communication is a feedback frame providing information identifying the preferred second device transmit sector.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure describes example techniques for establishing a device-to-device (D2D) communication link, in particular techniques for beamforming training. D2D communication refers to direct communication between devices of a network, without requiring routing of data through other network infrastructure (e.g., a base station). In some examples, establishing a D2D communication link may involve network infrastructure, such as an access point (AP) or primary connection point (PCP), for allocating communication resources, however the D2D communication itself does not involve network infrastructure.

Establishing a directional D2D communication link includes beamforming training to determine the preferred transmit sector in order to control the beam angle, among other parameters. In examples disclosed herein, the analog beamforming of each D2D communication link is trained by enabling a given station (ST) to obtain information from communications between other STs and the AP or PCP during association between the other STs and the AP or PCP. In this way, the given ST is able to obtain information to identify a preferred transmission sector between another ST and itself.

Figure 1A:
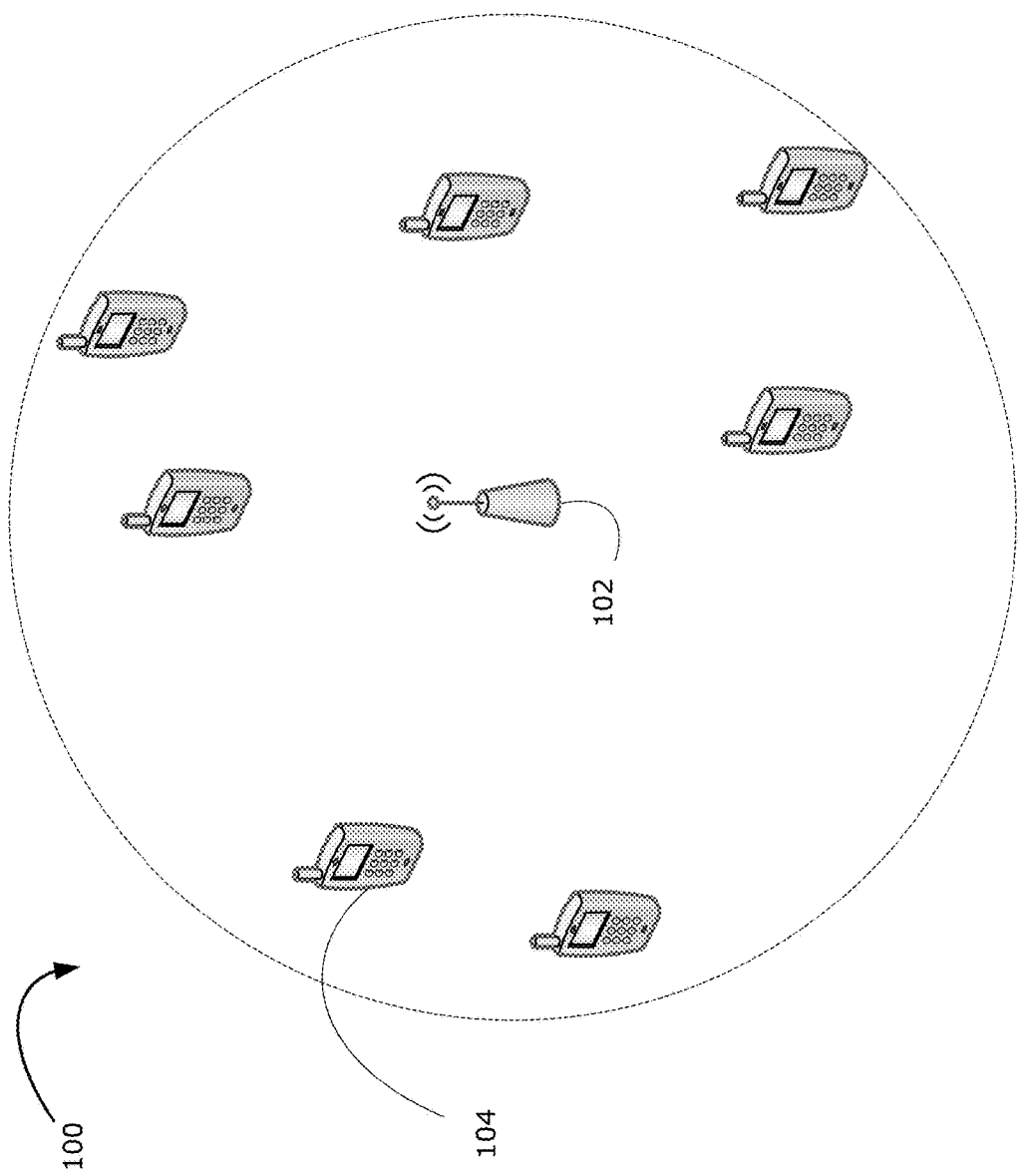
FIG. 1A is a schematic diagram of an example system in which D2D communication links may be established.

FIG. 1A is a schematic diagram of an example system in which D2D communication links may be established. The example system 100 in FIG. 1 is a wireless local area network (WLAN) including an AP 102 and multiple STs 104 within coverage (indicated by dotted line) of the AP 102. The AP 102 may be also referred to as a PCP or a base station. The AP 102 may be implemented as a router, for example. The ST 104 may also be referred to as a terminal, user device, user equipment (UE) or client, for example. Each ST 104 may be any suitable wireless device having beamforming capabilities, including mobile or stationary devices such as smartphones, laptops, mobile phones or tablet devices, for example, and the STs 104 of the system 100 need not be the same as each other.

The system 100 may support communication between the AP 102 and each ST 104, as well as communication directly between STs 104 (i.e., D2D communication). The system 100 may generally support non-directional communications as well a directional communications, including multi-directional communications (e.g., by the AP 102 to multiple STs 104 simultaneously). In this example, D2D communications use packets for transmission, thus is operated with saturate traffic.

Figure 1B:
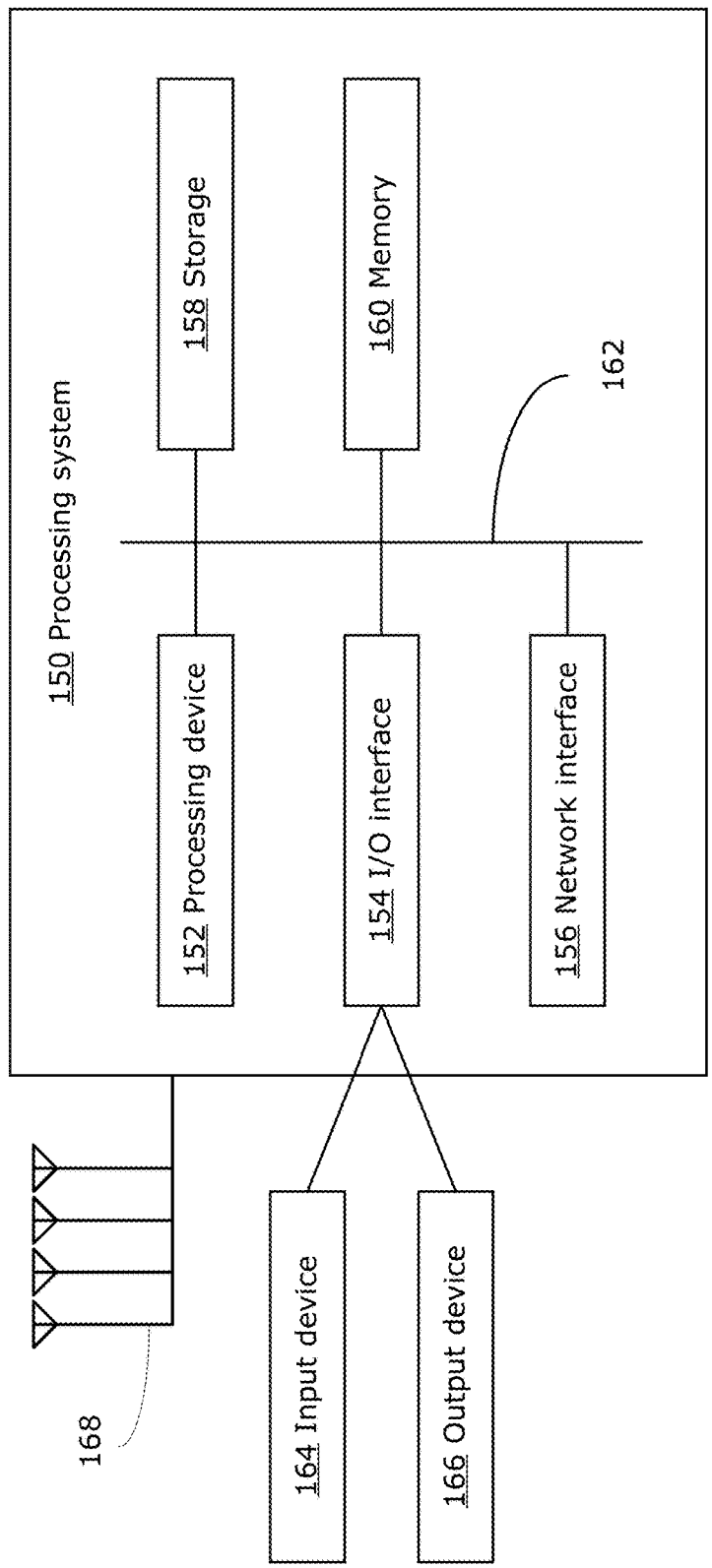
FIG. 1B is a block diagram illustrating an example station in the system of FIG. 1A.

FIG. 1B is a block diagram illustrating an example processing system 150, which may be used to implement the methods and systems disclosed herein, for example the AP 102 and/or one or more of the STs 104. Other processing systems suitable for implementing the present disclosure may be used, which may include components different from those discussed below. Although FIG. 1B shows a single instance of each component, there may be multiple instances of each component in the processing system 150.

The processing system 150 includes one or more processing devices 152, such as a processor, a microprocessor, an application-specific integrated circuit (ASIC), a field-programmable gate array (FPGA), a dedicated logic circuitry, or combinations thereof. The processing system 150 may also include one or more input/output (I/O) interfaces 154, which may enable interfacing with one or more appropriate input devices 164 and/or output devices 166. The processing system 150 includes one or more network interfaces 156 for wired or wireless communication with a network (e.g., an intranet, the Internet, a P2P network, a WAN, a LAN, and/or a Radio Access Network (RAN)). The network interface(s) 156 may include wired links (e.g., Ethernet cable) and/or wireless links for intra-network and/or inter-network communications. The network interface(s) 156 may provide wireless communication via one or more transmitters/receivers or transceiver antennas 168, for example. The antennas 168 may act together as an antenna array, in which case each antenna 168 may be referred to as an antenna element or radiating element of the antenna array. The processing system 150 may also include one or more storage units 158, which may include a mass storage unit such as a solid state drive, a hard disk drive, a magnetic disk drive and/or an optical disk drive.

The processing system 150 may include one or more memories 160, which may include a volatile or non-volatile memory (e.g., a flash memory, a random access memory (RAM), and/or a read-only memory (ROM)). The non-transitory memory(ies) 160 may store instructions (e.g., in the form of software modules) for execution by the processing device(s) 152, such as to carry out the methods described in the present disclosure. The memory(ies) 160 may include other software instructions, such as for implementing an operating system and other applications/functions. In some examples, one or more data sets and/or module(s) may be provided by an external memory (e.g., an external drive in wired or wireless communication with the processing system 150) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 162 providing communication among components of the processing system 150, including the processing device(s) 152, I/O interface(s) 154, network interface(s) 156, storage unit(s) 158 and/or memory(ies) 160. The bus 162 may be any suitable bus architecture including, for example, a memory bus, a peripheral bus or a video bus.

In FIG. 1B, the input device(s) 164 (e.g., a keyboard, a mouse, a microphone, a touchscreen, and/or a keypad) and output device(s) 166 (e.g., a display, a speaker and/or a printer) are shown as external to the processing system 150. In other examples, one or more of the input device(s) 164 and/or the output device(s) 166 may be included as a component of the processing system 150.

The AP 102 and STs 104 may each include a multi-element antenna array, and may carry out appropriate beamforming and beam steering controls (e.g., using beamsteering circuits and/or beamsteering control modules implemented by the processing device 152 and processing system 150), in order to carry out directional wireless communication. In particular, each ST 104 has multiple antennas 168 forming an antenna array and each ST 104 can define $N_a$ sectors for directional transmission and receiving. Half duplex mode is assumed for each antenna. In examples described herein, the carrier frequency is 60 GHz under directional multi-gigabit (DMG) mode. The beacon interval and communication establishment mechanism defined in the IEEE 802.11ad standard may be adopted to ensure backward compatibility.

To assist in understanding the present disclosure, some basics of the IEEE 802.11ad standard are described below.

The physical (PHY) layer has four categories defined in the IEEE 802.11ad standard, namely control PHY, single carrier (SC) PHY, orthogonal frequency-division multiplexing (OFDM) PHY and low power SC PHY. Different PHY layer categories use different transmission rate and modulation schemes. The control PHY defines the minimum transmission rate that a ST 104 may use for communication before a beamformed communication link is established (whether a communication link with the AP 102 or a D2D communication link with another ST 104). Let $R_{con}$ denote the data rate for control PHY. The remaining PHY categories are intended for data transmission. Let $R_{data}$ denote the data rate for the data transmission. According to the IEEE 802.11ad standard, 385 Mbps≤$R_{data}$≤6756.75 Mbps.

Figure 2:
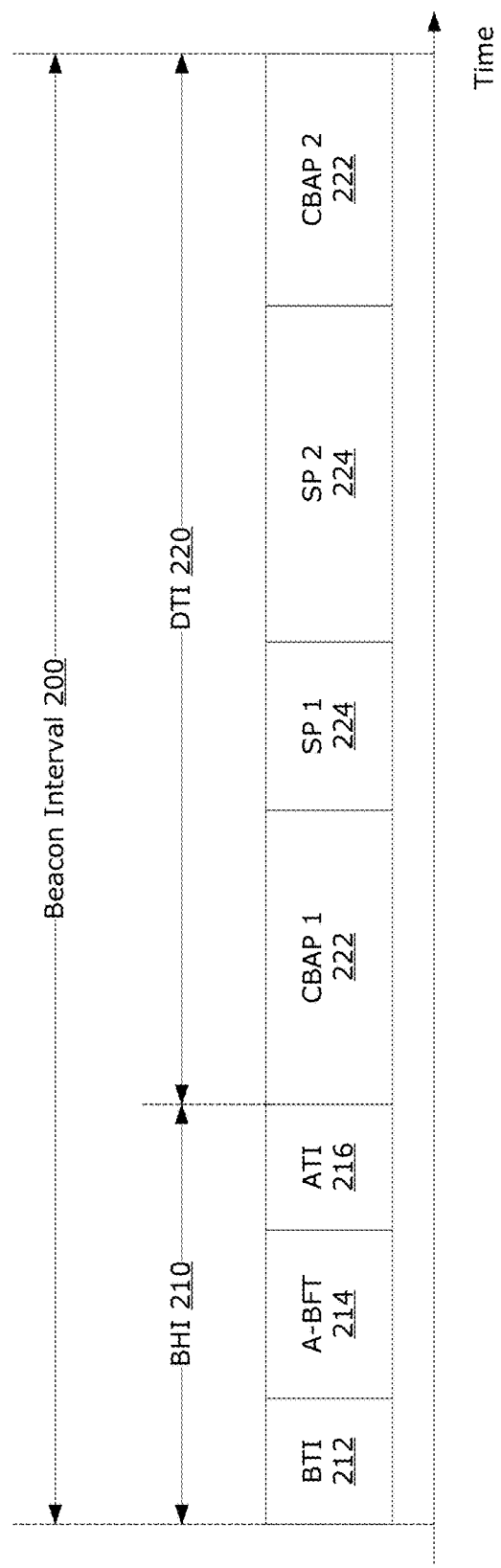
FIG. 2 is a block diagram illustrating different phases during an example beacon interval.

The beacon interval (BI) refers to the basic time frame defined in the IEEE 802.11ad standard. As shown in FIG. 2, for DMG mode, a BI 200 may be divided into a beacon header interval (BHI) 210 and a data transfer interval (DTI) 220. The BHI 210 may include a beacon transmission interval (BTI) 212, an association BF training (A-BFT) period 214, and an announcement transmission interval (ATI) 216. The DTI 220 may include multiple contention-based access periods (CBAPs) 222 and/or service periods (SPs) 224. Although FIG. 2 shows CBAPs 222 and SPs 224 in a particular order within the DTI 220, any order of CBAPs 222 and/or SPs 224 may take place during the DTI 220. CBAPs 222 may be enhanced distributed channel access (EDCA) periods and SPs 224 may be schedule access periods.

To maximize signal gain, analog BF is adopted in the IEEE 802.11ad standard to utilize the highly directional nature of 60 GHz communications. A BF protocol is defined in the IEEE 802.11ad standard to carry out BF training, to determine the appropriate receive and transmit sectors for communication between a transmitter and a receiver. In the IEEE 802.11ad standard, the same BF protocol is used for both communications between the AP 102 and a ST 104 and for D2D communications between two STs 104. The BF protocol includes three stages, namely a sector level sweep (SLS) stage, an optional beam refinement phase (BRP) and a beam tracking (BT) stage. The SLS stage is carried out to align transceiver pairs (e.g., an AP 102 as transmitter and a ST 104 as receiver) with each other using coarse beams, and the optional BRP stage provides more refined and narrow beam alignment. Since channels are not reciprocal when operating in frequency-division duplexing (FDD) mode, BF training is utilized both at the transmitter and the receiver.

Figure 3:
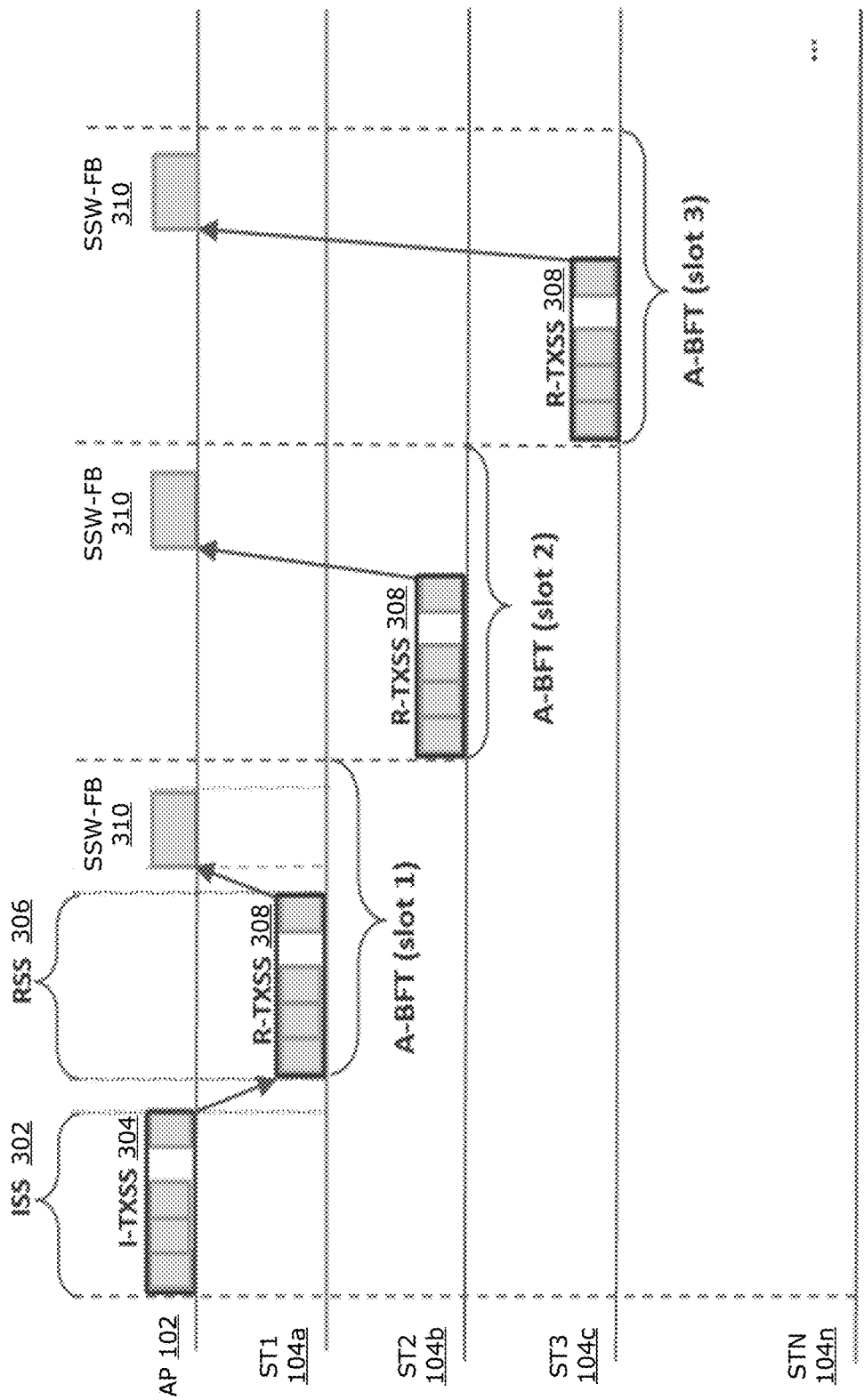
FIG. 3 is a diagram illustrating example communications during a sector level sweep.

FIG. 3 shows an example of the SLS stage carried out between the AP 102 and multiple STs 104 during association of the STs 104 with the AP 102. In this example, there are N STs 104, individually labeled as ST1 104a, ST2 104b, ST3 104c . . . STN 104n (collectively referred to as STs 104). In the SLS stage, sector sweep (SSW) frames are exchanged between a transmitter (in this example, the AP 102) and receiver (in this example, the STs 104). The SSW frames are transmitted over different antenna sectors, the sector in which a frame is transmitted being identified (e.g., using a sector identifier field in the frame). The preferred sector for transmitting and receiving between the transceiver pair may then be determined by selecting the sector identified by the SSW frame having the preferred signal quality (e.g., higher signal-to-noise ratio (SNR)).

As shown in FIG. 3, the SLS stage includes an initiator sector sweep (ISS) 302 during which an initiator transmit sector sweep (I-TXSS) beacon 304 is transmitted by the AP 102. Because the AP 102 does not yet have sufficient information to select a preferred transmit sector, the I-TXSS beacon 304 may include SSW frames being transmitted in all sectors. A given ST 104 measures the strength of the received signal and determines the preferred AP transmit sector (e.g., having highest SNR) for transmission from the AP 102 to the given ST 104. This is performed by each ST 104. Each ST 104 then replies to the ISS 302 with a responder sector sweep (RSS) 306, during which a responder transmit sector sweep (R-TXSS) beacon 308 is transmitted by the ST 104. Because the ST 104 does not yet have sufficient information to select a preferred transmit sector, the R-TXSS beacon 308 may include SSW frames being transmitted in all sectors.

The R-TXSS beacon 308 transmitted from a given ST 104 to the AP 102 includes information about the preferred AP transmit sector for transmission from the AP 102 to the given ST 104, as determined by the given ST 104. Upon receipt of the R-TXSS beacon 308 from a ST 104, the AP 102 has information about the preferred AP transmit sector for transmission to that ST 104. The AP 102 also measures the strength of the received signal from the R-TXSS beacon 308 transmitted by that ST 104 and determines the preferred ST transmit sector (e.g., having highest SNR) for transmission from that ST 104 to the AP 102. The AP 102 then transmits a sector sweep feedback (SSW-FB) frame 310 to that ST 104, using the preferred AP transmit sector. The SSW-FB frame 310 includes information about the preferred ST transmit sector. Upon receipt of the SSW-FB frame 310, the ST 104 has information about the preferred ST transmit sector for transmission to the AP 102. Optionally, a sector sweep acknowledgement (SSW-ACK) frame (not shown) may be transmitted by the ST 104 to the AP 102. In this way, the SLS stage of BF training determines the preferred transmit sectors of both the AP 102 and the ST 104 for communication to each other.

The beacons 304, 308 transmitted during the ISS 302 and RSS 306 each include $N_a$ SSW frames (corresponding to the $N_a$ sectors defined for directional communication), where the length of each SSW frame is $B_{ssw}$ bytes. Each of the $N_a$ SSW frames are sent using a directional beam in a specific one of the $N_a$ sectors. After receiving $N_a$ SSW frames, a receiver uses the received data to determine the preferred sector for directional communication with the transmitter, based on the signal power of each SSW frame received.

The I-TXSS beacon 304 is transmitted during the BTI 212 portion of the BI 200, and the R-TXSS beacons 308 from each ST 104 are transmitted during respective slots in the A-BFT 214 portion of the BI 200. It should be noted that the number of STs 104 that can be associated to the AP 102 in a given BI 200 is limited by the number of available slots in the A-BFT 214 period. Let $N_f$ denote the maximum number of STs 104 that can be associated during the A-BFT 214 period. The STs 104 may contend for one of the slots available during A-BFT 214 via a random access mechanism, for example. In FIG. 3, ST1 104 transmits its R-TXSS beacon 308 during slot 1 of the A-BFT 214; ST2 104 transmits its R-TXSS beacon 308 during slot 2 of the A-BFT 214; and ST3 104 transmits its R-TXSS beacon 308 during slot 3 of the A-BFT 214.

Two conventional approaches to establishing D2D communication links in the IEEE 802.11ad standard are via designated service period (SP) and via dynamic allocation. In these conventional approaches, establishing D2D communication links occurs only after the STs 104 involved in the D2D communication have been associated with the AP 102 (e.g., as described above).

Two steps are involved in establishing a D2D communication link via SP. Establishing the D2D communication link is initiated by one of the STs 104 (typically the transmitter) that will participate in the D2D communication. First, a state management entity (SME) (e.g., which may be implemented by the processing device 152 of the ST 104) in the ST 104 initiates a request for D2D communication, and the request is transmitted from the ST 104 to the AP 102. Second, after receiving the request, the AP 102 may reject the request (e.g., to avoid potential inference) or accept the request. If the AP 102 accepts the request, the AP 102 transmits an extended schedule element to schedule SP for the D2D communication.

Three steps are involved in establishing a D2D communication link via dynamic allocation. First, the AP 102 polls one of the STs 104 (typically the transmitter) that will participate in the D2D communication. Then, the ST 104 replies with a service period request. After receiving the request, the AP 102, within the same BI, allocates a particular channel time for the D2D communication link by transmitting a grant frame. It should be noted that the allocated channel time can be a SP duration or a CBAP duration.

Regardless of whether the designated SP approach or the dynamic allocation approach is used to obtain channel access time for a D2D communication link, BF at both the transmitter and receiver STs 104, including at least the SLS stage, similar to that described above with reference to FIG. 3, is required at every BI 200 to enable DMG mode. If more D2D communication links and STs 104 are to be supported by the AP 102 (e.g., more than eight STs 104 to be supported by the AP 102), the time spent in BF establishment increases significantly, and the time between consecutive transmission for a link increases.

The present disclosure describes example methods to reduce BF overhead for establishing D2D communication links, by enabling a ST 104 to obtain at least some BF training information via SLS communications between the AP 102 and other STs 104. When the ST 104 obtains information from communications not intended for itself (e.g., from communications between the AP 102 and another ST 104), this may be referred to as "over-listening" or "eaves-dropping". In the examples discussed below, it is assumed that a transmitting ST 104 already knows the MAC address of its intended D2D receiver(s).

Figure 4:
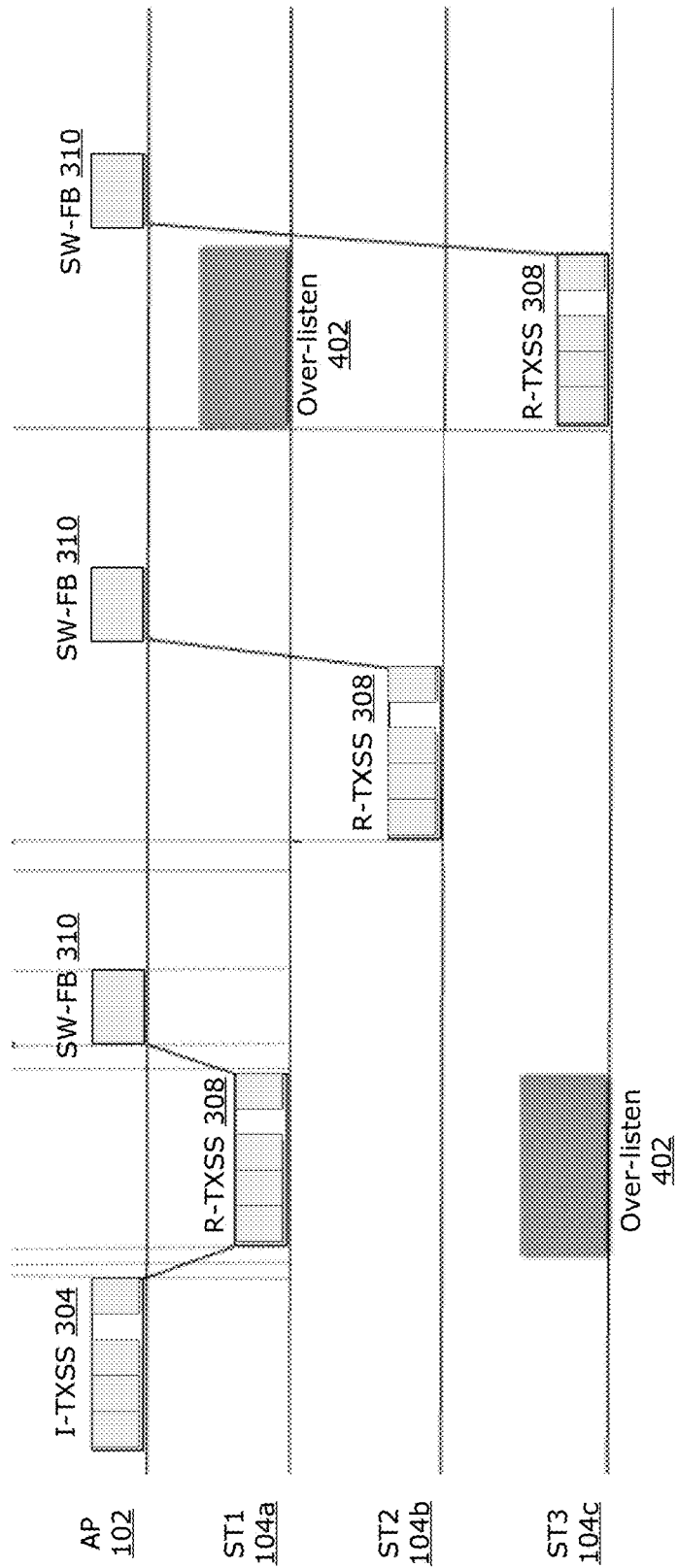
FIG. 4 is a diagram illustrating an example of over-listening during a sector level sweep.

FIG. 4 illustrates an example method in which over-listening is used to reduce the time required for BF training in establishing a D2D communication link. The transmission of I-TXSS beacon 304, R-TXSS beacons 308 and SW-FB frames 310 is similar to that described above with reference to FIG. 3. Additionally, each ST 104 also obtains information from the R-TXSS beacon 308 sent during the A-BFT 214 period by other STs 104. As mentioned above, the R-TXSS beacon 308 typically includes SSW frames transmitted in all sectors. Thus, though the R-TXSS beacon 308 from a given ST 104 is intended to be received by the AP 102, other STs 104 may nonetheless receive the R-TXSS beacon 308. For example, the R-TXSS beacon 308 transmitted by ST1 104a may be received by ST3 104c. Rather than discarding or otherwise ignoring the R-TXSS beacon 308 that is not intended for itself, ST3 104c may use information contained in the R-TXSS beacon 308 to determine a preferred transmit sector for D2D communication between ST3 104c and ST1 104a. This may be referred to as ST3 104c over-listening 402 to the R-TXSS beacon 308 transmitted by ST1 104a to the AP 102. Similarly, ST1 104a may over-listen 402 to the R-TXSS beacon 308 transmitted by ST3 104c to the AP 102.

Although FIG. 4 does not show ST2 104b performing any over-listening, it should be understood that ST2 104b may also over-listen to any R-TXSS beacons 308 not intended for itself. For example, both ST2 104b and ST3 104c may over-listen 402 to the R-TXSS 308 transmitted by ST1 104a.

Figure 5A:
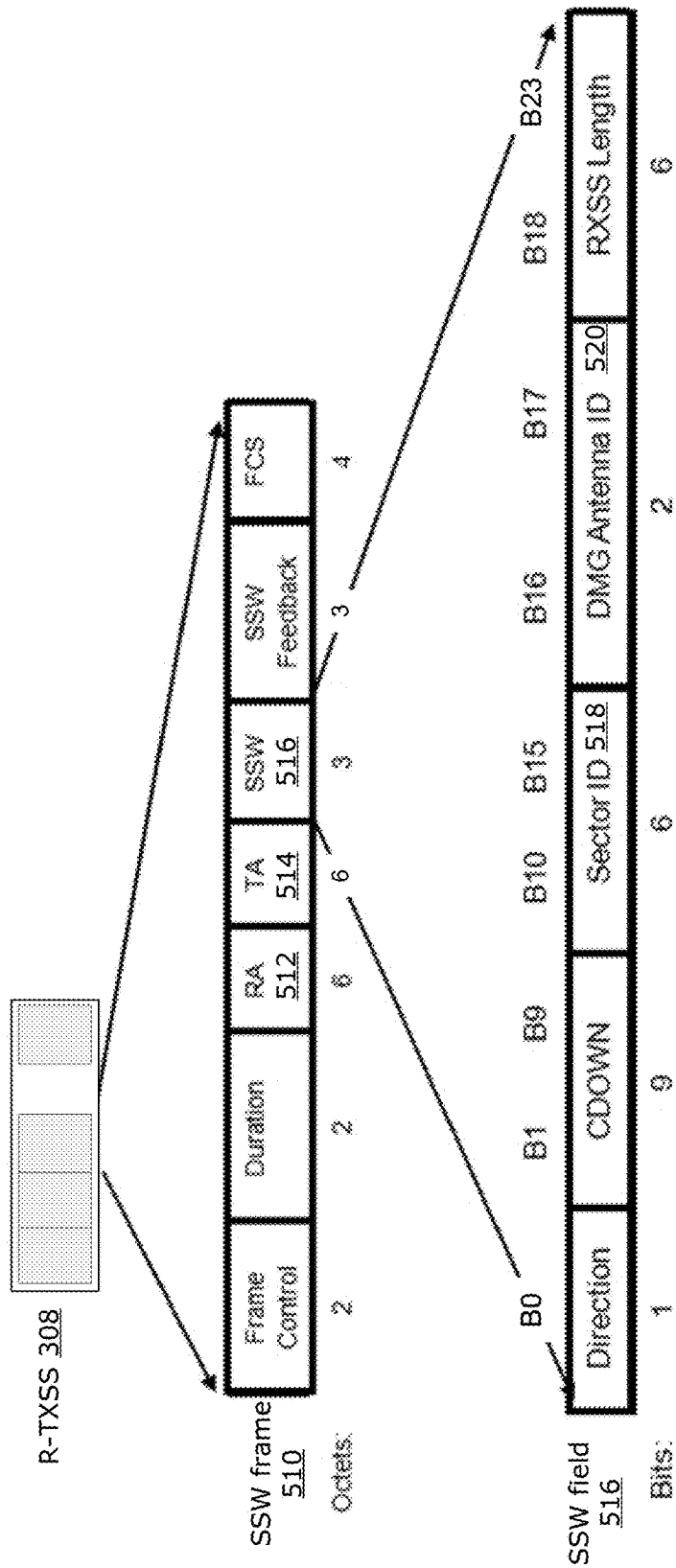
FIG. 5A is a block diagram showing an example format for a sector sweep beacon.

To understand how a ST 104 may obtain information from a beacon not intended for itself, the format of the R-TXSS beacon 308, as defined in the IEEE 802.11ad standard, is now discussed, with reference to FIG. 5A. A similar format may be used for the I-TXSS beacon 304. The R-TXSS beacon 308 is composed of $N_a$ SSW frames 510 (one SSW frame 510 per transmit sector), one of which is shown in detail. As shown in FIG. 5A, each SSW frame 510 contains data identifying the receiver and the transmitter of the SSW frame 510, for example in the receiver address (RA) field 512 and the transmitter address (TA) field 514. For example, when the R-TXSS beacon 308 is transmitted during the A-BFT stage 214, the RA field 512 contains the MAC address of the AP 102, and the TA field 514 contains the MAC address of the ST 104 sending the SSW frame 510. The SSW frame 510 also includes a SSW field 516. The SSW frame 510 also contains additional fields, as shown in FIG. 5A, which will not be described in detail here. The SSW field 516 contains a sector ID field 518 containing data identifying the sector (e.g., using a sector identifier) in which the SSW frame 510 is sent. The SSW field 516 also contains a DMS antenna ID field 520 containing data identifying (e.g., using an antenna identifier) the DMG antenna used for sending the SSW frame 510. The SSW field 516 also contains additional fields, as shown in FIG. 5, which will not be described in detail here.

Figure 5B:
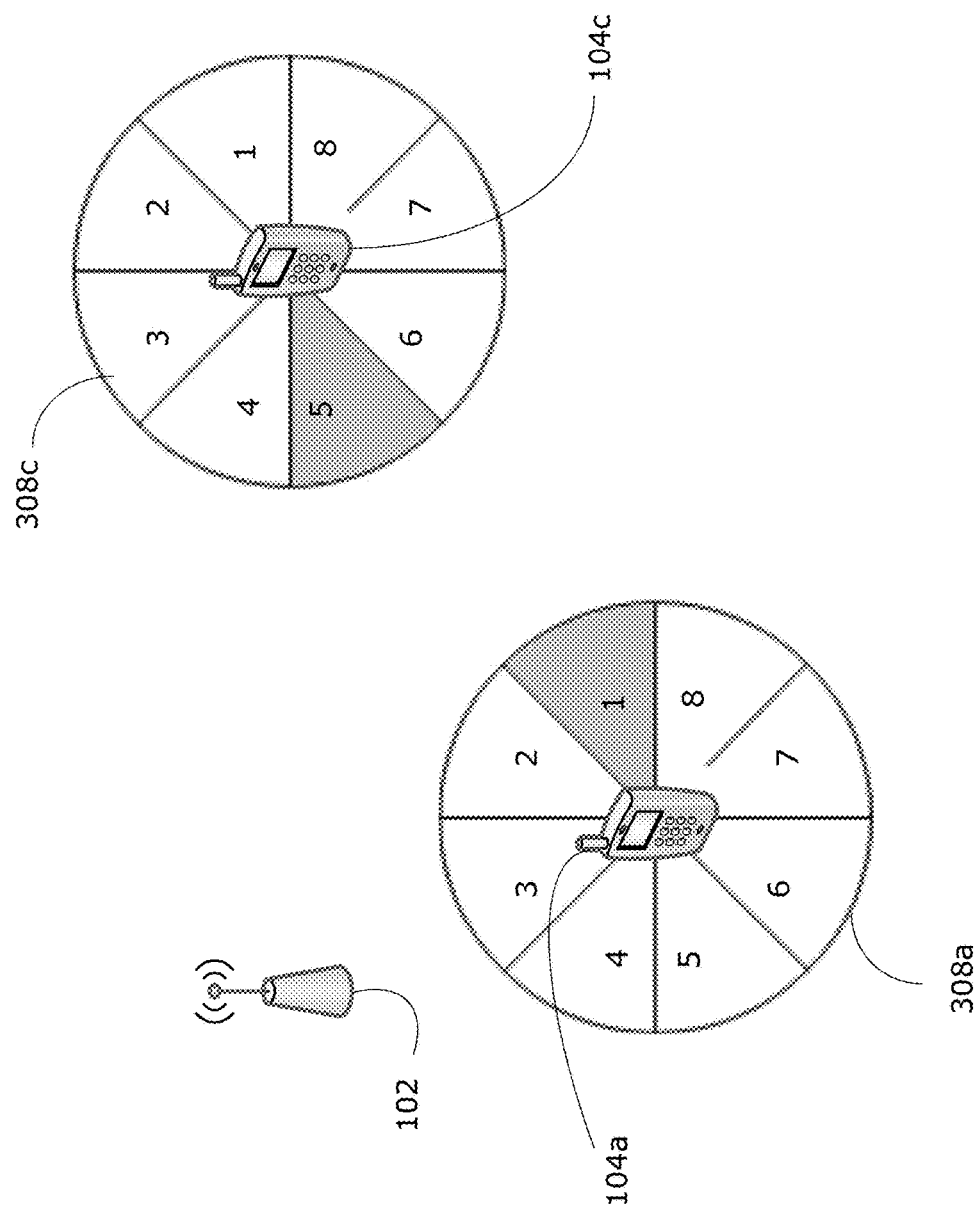
FIG. 5B is a schematic diagram illustrating example transmit sectors for D2D communication between two stations.

Returning to the example of FIG. 4, when ST1 104a transmits the R-TXSS beacon 308, although the AP 102 is the intended recipient of the R-TXSS beacon 308, the R-TXSS beacon 308 includes SSW frames 510 transmitted in all sectors, as discussed above. This is illustrated in FIG. 5B. For simplicity, the R-TXSS beacon 308a is shown as being transmitted by ST1 104a over eight sectors, however there may be a greater number of sectors (e.g., 512 sectors) defined for directional wireless communication.

When ST3 104c over-listens 402 to the R-TXSS beacon 308a transmitted by ST1 104a, ST3 104c determines which of the SSW frames 510 of the R-TXSS beacon 308a has a preferred signal quality (e.g., highest SNR), identifies (e.g., using data contained in the sector ID field 518) the sector in which the SSW frame 510 was transmitted, and further identifies (e.g., using the TA field 514) ST1 104a from which the SSW frame 510 originated. In this way, ST3 104c is able to determine the preferred transmit sector from ST1 104a to itself. In the example of FIG. 5B, ST3 104c receives the R-TXSS beacon 308a transmitted by ST1 104a (and intended to be received by the AP 102) and determines that sector 1 is the preferred transmit sector to be used by ST1 104a for transmission to ST3 104c. Similarly, by over-listening 402 to other R-TXSS beacons 308 transmitted by all other STs 104, ST3 103c is able to determine the preferred transmit sector from all other STs 104 to itself.

Similar over-listening 402 is performed by all other STs 104. In the example of FIG. 5B, ST1 104a receives the R-TXSS beacon 308c transmitted by ST3 104c (and intended to be received by the AP 102) and determines that sector 5 is the preferred transmit sector to be used by ST3 104c for transmission to ST1 104a.

In this way, the STs 104 are able to determine the preferred transmit sectors for each other ST 104, and the SLS stage for D2D communication links in the same BI 200 can be omitted.

Figure 6:
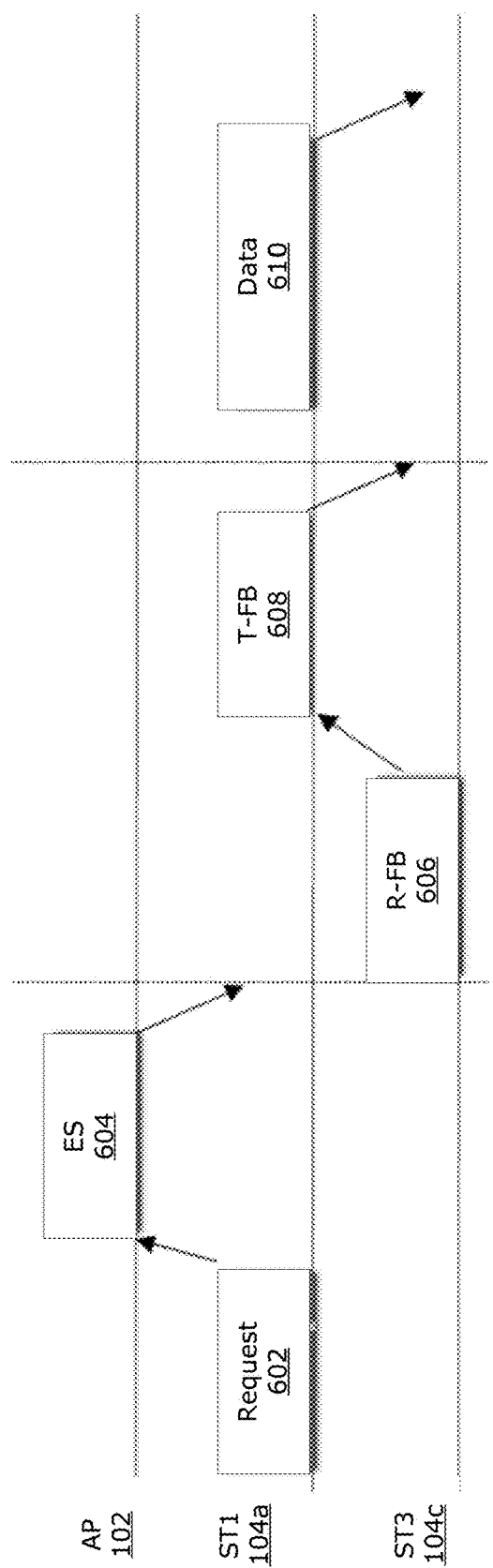
FIG. 6 is a diagram illustrating example communications during a feedback phase between two stations.

After performing over-listening, all the STs 104 have identified the preferred transmit sector for transmissions from other STs 104 to itself. However, the STs 104 have not yet identified the preferred transmit sector for its own transmissions for D2D communications. This information may be obtained using communication of feedback frames, as illustrated in FIG. 6. Communication of the feedback frames may take place during the channel time that has been allocated by the AP 102 for the D2D communication link, as discussed below.

FIG. 6 illustrates example communications for establishing a D2D communication link between ST1 104a and ST3 104c. In this example, ST1 104a is the transmitter for the intended D2D communication and ST3 104c is the receiver. Similarly to the designated SP method defined in the IEEE 802.11ad standard for establishing D2D communications, as described above, the process begins with the intended transmitter, in this case ST1 104a, transmitting a request 602 for D2D communication to the AP 102 and the AP 102 transmitting an extended schedule (ES) element 604 informing ST1 104a of the SP scheduled for D2D communication. Alternatively, channel time for the D2D communication may be granted via dynamic allocation, as described above.

Regardless of how resources are granted for the D2D communication, following allocation of channel time, instead of performing the SLS stage as would be the case conventionally under the IEEE 802.11ad standard, SLS may be omitted. This is because, as discussed above, at least some BF information has been obtained by over-listening. For example, by over-listening, ST3 104c has identified that sector 1 is the preferred transmit sector for ST1 104a to transmit to ST3 104c. ST3 104c may further over-listen to the transmission of the ES element 604 from the AP 102 to ST1 104a, such that ST3 104c has obtained information about the granted timing interval for communicating directly with ST1 104a. ST3 104c may then communicate information about the preferred transmit sector to ST1 104a by transmitting a receiver feedback (R-FB) frame 606 to ST1 104a. Because ST3 104a does not yet have information about which transmit sector to use for transmission to STA 104a, the R-FB frame 606 may be sent in a sector sweep. Similarly, by over-listening, ST1 104a has identified that sector 5 is the preferred transmit sector for ST3 104c to transmit to ST1 104a. ST1 104a may communicate this information to ST3 104c by transmitting a transmitter feedback (T-FB) frame 608 to ST3 104c.

Figure 7:
FIG. 7 is a block diagram showing an example format for a feedback frame.

The R-FB and T-FB frames 606, 608 are formatted similarly to the format for the SSW-FB frame 310, as defined in the IEEE 802.11ad standard. FIG. 7 illustrates an example suitable format for the R-FB frame 606. The same format may be used for the T-FB frame 608. The R-FB frame 606 includes a receiver address field 702 and a transmitter address field 704, similar to that described above for the SSW frame 510. The R-FB frame 606 includes a SSW feedback field 706. The R-FB frame 606 also contains additional fields, as shown in FIG. 7, which will not be described in detail here. The SSW feedback field 706 includes a sector select field 708 containing data identifying (e.g., using a sector identifier) the preferred transmit sector determined by over-listening. The SSW feedback field 706 also includes a SNR report field 710 containing the calculated SNR value of the preferred transmit sector. The information contained in the SNR report field 710 may be used to determine the transmission power and transmission rate. The SSW feedback field 706 also contains additional fields, as shown in FIG. 7, which will not be described in detail here.

It should be noted that, for example where ST3 104c is the receiver and ST1 104a is the transmitter for intended D2D communication, the R-FB frame 606 transmitted by ST3 104c contains information identifying the preferred transmit sector (sector 1 in the example of FIG. 5B) to be used by ST1 104a, and the T-FB frame 608 transmitted by ST1 104a contains information identifying the preferred transmit sector (sector 5 in the example of FIG. 5B) to be used by ST3 104c. In this way, after the feedback frames 606, 608 have been received, each ST 104a, 140c has information identifying the preferred transmit sector to be used by itself for transmission to each other. Data 610 may then be communicated directly between the STs 104a, 140c in D2D communication.

Figure 8:
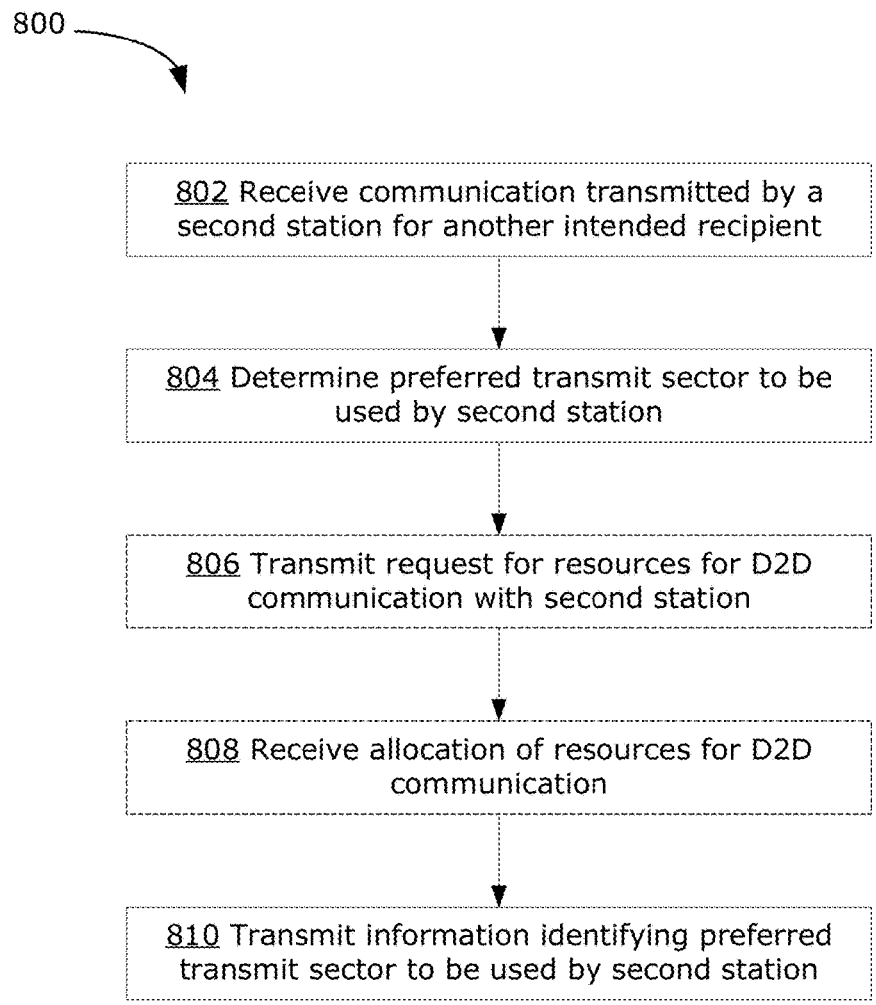
FIG. 8 is a flowchart illustrating an example method for D2D communications.

FIG. 8 is a flowchart illustrating an example method 800 for establishing D2D communication. The method 800 may be carried out by the processing device in a ST, such as ST1 104a or ST3 104c described above.

At 802, a first ST receives a communication transmitted by a second ST, where the communication is intended for another recipient other than the first ST. The communication may contain information (e.g., data contained in a sector ID field 518) identifying the sector on which it was transmitted, or may otherwise have properties or characteristics enabling identification of the sector on which it was transmitted. The first ST may receive a plurality of such communications, transmitted by the second ST over respective different sectors. In the example illustrated by FIG. 5B, ST1 104a over-listens to an R-TXSS beacon 308c transmitted by ST3 104c to the AP 102; similarly ST3 104c over-listens to an R-TXSS beacon 308a transmitted by ST1 104a to the AP 102.

At 804, the first ST determines, based on the received communication, the preferred transmit sector that should be used by the second ST for D2D communication from the second ST to the first ST. The preferred transmit sector may be determined by calculating which received communication has a preferred signal quality (e.g., highest SNR) and then identifying (e.g., using sector ID data contained in the communication) the sector on which that communication was transmitted. In the example illustrated by FIG. 5B, ST1 104a determines that sector 5 is the preferred transmit sector to be used by ST3 104c for D2D communications from ST3 104c to ST1 104a; and ST3 104c determines that sector 1 is the preferred transmit sector to be used by ST1 104a for D2D communications from ST1 104a to ST3 104c.

Optionally, if the first ST is intended to be the transmitter for the D2D communication, then at 806 the first ST transmits a request (e.g., to the AP) for resources for the D2D communication, such as a request for allocation of channel time. At 808 the first ST then receives (e.g., from the AP) allocation of the requested resources for the D2D communication. The request and allocation of resources may be carried out via designated SP or dynamic allocation, for example. 806 and 808 may be omitted if the first ST is intended to be the receiver for the D2D communication. In order to carry out 806 and 808, the first ST should be already associated with the AP.

At 810, the first ST transmits information to the second station identifying the preferred transmit sector that should be used by the second ST for the D2D communication. This information may be transmitted using a feedback frame, for example. In the example illustrated by FIG. 5B, ST1 104a transmits a feedback frame to ST3 104c identifying sector 5 as the preferred transmit sector to be used by ST3 104c; and ST3 104c transmits a feedback frame to ST1 104a identifying sector 1 as the preferred transmit sector to be used by ST1 104a.

It should be noted that 810 may be preceded or followed by the first ST receiving a communication from the second ST providing information identifying the preferred transmit sector that should be used by the first ST for the D2D communication.

Where the first ST is intended to be the transmitter for the D2D communication, the first ST may have received a R-FB frame from the second ST providing information identifying the preferred transmit sector to be used by the first ST, and the first ST may transmit a T-FB frame to the second ST providing information identifying the preferred transmit sector to be used by the second ST. Where the first ST is intended to be the receiver for the D2D communication, the first ST may transmit a R-FB frame to the second ST providing information identifying the preferred transmit sector to be used by the second ST, and the first ST may further receive a T-FB frame from the second ST providing information identifying the preferred transmit sector to be used by the first ST.

After the method 800 has been completed, the first and second STs each has information identifying the preferred transmit sector to be used by itself for D2D communication with the other ST. Data may then be transmitted/received in the D2D communication between the two STs, with each ST using the respective identified preferred transmit sectors.

In some examples, both the transmitter ST 104 and the receiver ST 104 of the D2D communication link successfully associated with the AP 102 in the same BI 200. Because the transmitter ST 104 initiates establishment of the D2D communication link by requesting channel access from the AP 102 (e.g., during the ATI 216 after successful association in the A-BFT stage 214), resources for the D2D communication link can be granted by the AP 102 only if the transmitter ST 104 has associated with the AP 102.

In some examples, however, the receiver ST 104 might not be associated with AP 102 in the current BI 200, for example due to unsuccessful contention for association in the A-BFT stage 214. In that case, the receiver ST 104 did not perform a sector sweep and the transmitter ST 104 thus did not have the opportunity to determine the preferred transmit sector of the receiver ST 104 via over-listening.

Figure 9:
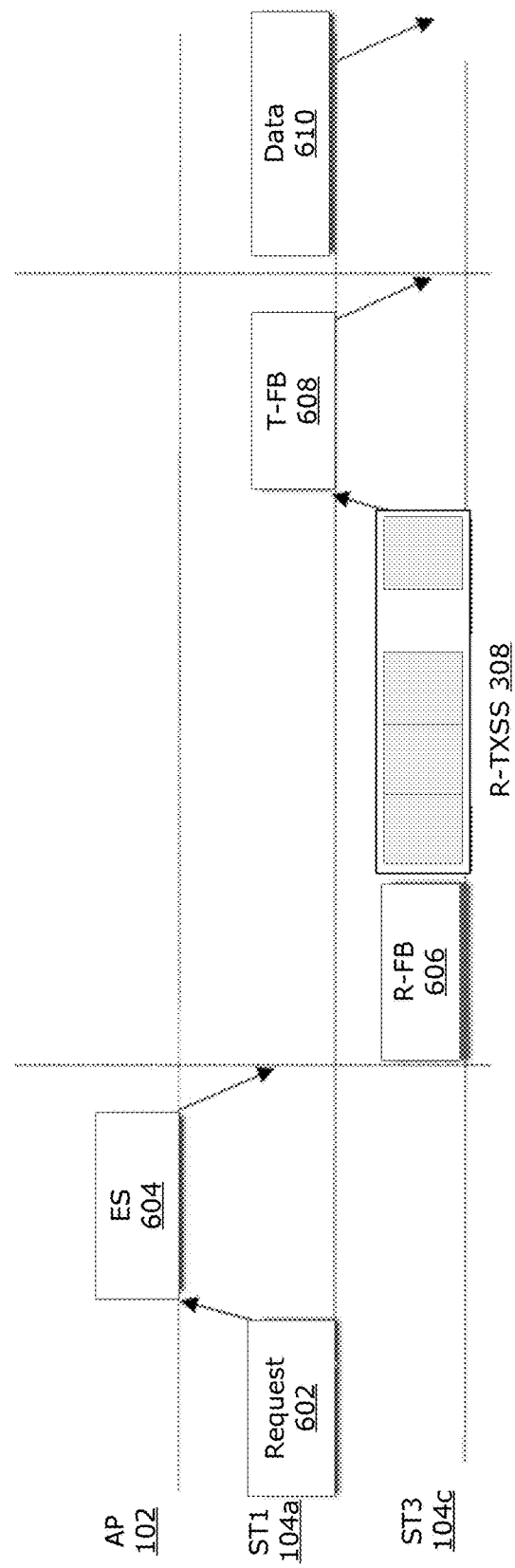
FIG. 9 is a diagram illustrating another set of example communications during a feedback phase between two stations.

FIG. 9 illustrates an example mechanism for addressing this situation. In this example, ST1 104a has associated with the AP 102 and is the transmitter for the D2D communication. ST3 104c is the intended receiver for the D2D communication, but ST3 104c did not associate with the AP 102 during the BI 200. However, ST3 104c did have the opportunity to over-listen during the association of ST1 104a with the AP 102 and thus ST3 104c has determined the preferred transmit sector to be used by ST1 104a for D2D communication with ST3 104c.

ST1 104a requests channel time allocation from the AP 102 and is allocated channel time for the D2D communication, similarly to that described above with reference to FIG. 6. ST3 104 transmits an R-FB frame 606, similarly to that described above with reference to FIG. 6. ST3 104c then performs SLS, and transmits an R-TXSS beacon 308 to all sectors. This enables ST1 104a to determine the preferred transmit sector to be used by ST3 104c for D2D communication with ST1 104a. ST1 104a then transmits a T-FB frame 608 to inform ST3 104c of the identified preferred transmit sector, similarly to that described above with reference to FIG. 6. Data 610 may then be communicated over the D2D communication link.

The example method 800 shown in FIG. 8 may be adapted to implement the communications illustrated by FIG. 9. Consider the situation where the first ST is the intended receiver ST of a D2D communication link that is to be established, but the first ST has not associated with the AP. The second ST is the intended transmitter ST of the D2D communication link, and has successfully associated with the AP. The first ST performs 802 and 804 as described above. The first ST does not perform 806 and 808 (the request for channel time allocation for the D2D communication is instead performed by the second ST). The first ST then performs 810. Additionally, the first ST transmits a communication (e.g., the R-TXSS 308) that provides information to the second ST to enable the second ST to determine the preferred transmit sector to be used by the first ST.

To illustrate possible improvements over conventional methods for establishing a D2D communication, example simulation results are now discussed. It should be understood that these simulation results are for the purpose of illustration only and are not intended to be limiting.

For the example simulation results, the number of stations in the network is chosen from the range of 8 to 64. The number of maximum consecutive failed association attempts before the station freezes from transmission is chosen from the range of 2 to 8. The number of slots available during the A-BFT period, $N_f$, is set to be 8 unless specified. Other simulation parameters are as follows:

Duration of short inter-frame space ($T_{sifs}$): 3 μs
Duration of short BF inter-frame space ($T_{sbifs}$) 1 μs
Data rate for control PHY ($R_{con}$): 27.5 Mbps
Data rate for data transmission in other PHY ($R_{data}$): 6.7 Gbps
Length of SSW-FB frame ($L_{sf}$): 26 bytes
Length of SSW frame ($L_{ssw}$): 26 bytes
Number of sectors ($N_a$): 4

The performance gain of the disclosed over-listening mechanism is discussed with reference to FIGS. 10 and 11, which show simulation results for the example network configuration defined by the parameters described above.

Figure 10:
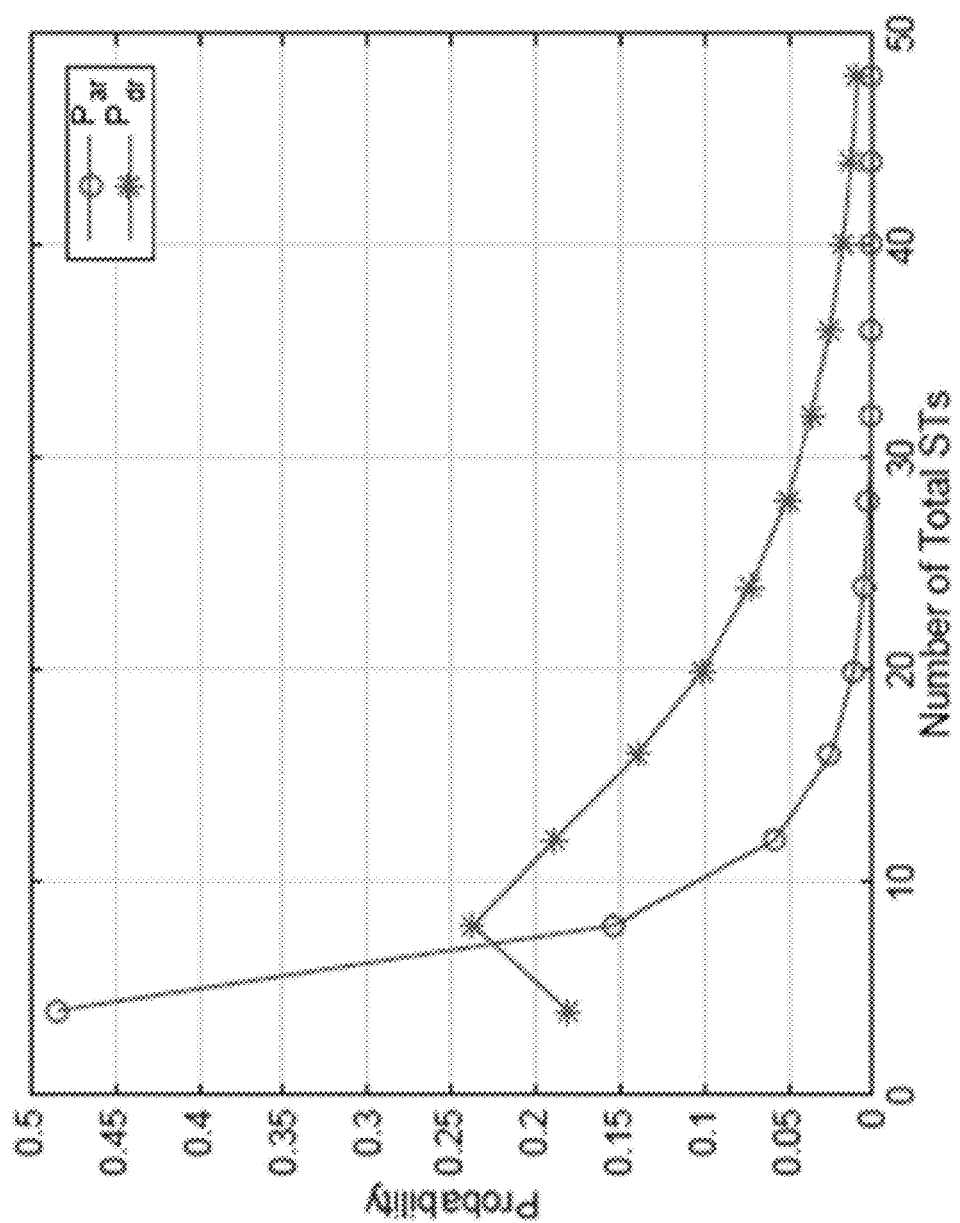
FIG. 10 is a chart showing simulation results illustrating the impact of the number of stations on successful association of transmitter and receiver stations.

FIG. 10 is a chart showing simulation results that illustrate the probability ($P_{dr}$) that only the transmitter ST of a D2D communication link is associated with the AP, and the probability ($P_{ar}$) that both the transmitter ST and the receiver ST of the D2D communication link are associated with the AP. It can be seen that, with the increase of the number of total STs from 4 to 48, $P_{ar}$ drops from 48.49% to 0.01%, whereas $P_{dr}$ reaches the maximum value of 23.68% and decreases to 0.85%. These results suggest that the use of over-listening, such as described above, may be more advantageous where there are fewer STs contending for association with the AP.

Figure 11:
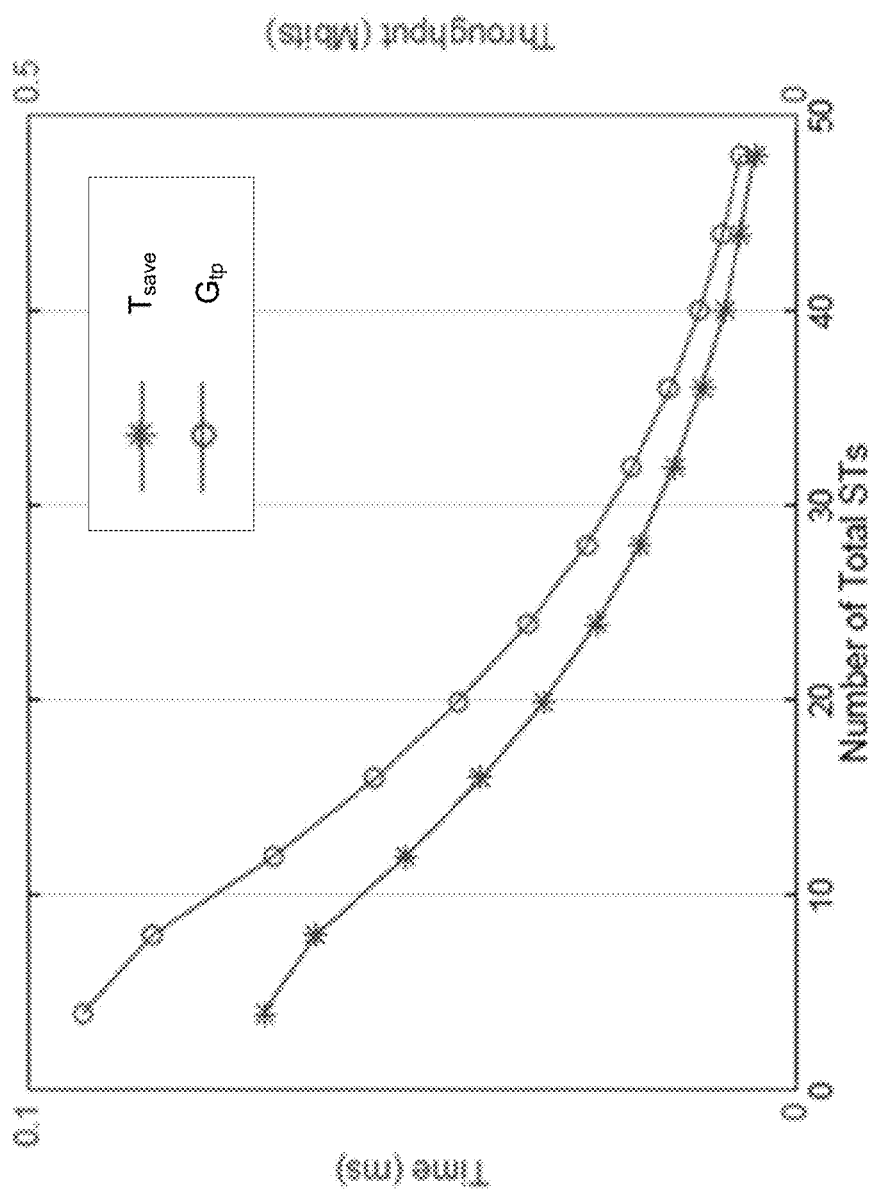
FIG. 11 is a chart showing simulation results illustrating the impact of the number of stations on time saving and throughput gain provided by the use of over-listening.

FIG. 11 is a chart showing simulation results that illustrate the average time saving and potential throughput gain in a BI using an example of the over-listening approach described above. It can be seen that, where the AP coverage includes a range of 4 to 48 STs, the average time duration ($T_{save}$) that can be saved in each BI was found to be in the range of 69 μs to 5 μs. If a maximum data rate of 6.7 Gbps is adopted for the simulation, the potential throughput gain ($G_{tp}$) was found to be in the range of 0.464 Mbps to 0.035 Mbps for each BI. These simulation results suggest that the use of over-listening, such as described above, may help to reduce the beamforming overhead. The advantages of the over-listening approach may be further improved where there is high probability of successful association of the ST to the AP.

For example, an increase in the number of available slots in the A-BFT phase may increase the probability of successful association of a ST, which in turn may be expected to further augment the usefulness of the over-listening approach, as disclosed in examples provided herein.

In various described herein, the use of over-listening may enable a reduction in beamforming overhead for establishing D2D communication. The over-listening approach may be based on the BF protocol defined in the IEEE 802.11ad standard, which may enable the examples of the present disclosure to be backwards compatible.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for device-to-device (D2D) communication between a first device and a second device, the method comprising:

at the first device, receiving a first communication transmitted by the second device, where the first communication is intended for another recipient other than the first device and the first device is not an intended recipient of the first communication, wherein the first device uses information obtained from the first communication to determine a preferred second device transmit sector to be used by the second device for the D2D communication;

at the first device, transmitting a second communication to the second device, the second communication providing information identifying the preferred second device transmit sector to be used by the second device for the D2D communication; and at the first device, engaging in the D2D communication with the second device by performing at least one of: receiving data from the second device, the data having been transmitted by the second device on the preferred second device transmit sector; or transmitting data to the second device, the data being transmitted by the first device on a preferred first device transmit sector identified in a third communication received from the second device.

2. The method of claim 1, wherein the first communication is a sector sweep (SSW) frame transmitted by the second device, the SSW frame providing information identifying a sector on which the SSW frame was transmitted.

3. The method of claim 2, wherein the preferred second device transmit sector is determined by:
   calculating a signal-to-noise ratio (SNR) ratio for each of a plurality of received SSW frames; and
   identifying the sector on which the SSW frame having the highest SNR was transmitted.

4. The method of claim 1, wherein the second communication is a feedback frame providing information identifying the preferred second device transmit sector.

5. The method of claim 1, wherein the first device is a transmitter for the D2D communication, wherein the first device receives the third communication from the second device prior to the first device transmitting the second communication to the second device.

6. The method of claim 5, wherein the first device is associated with an access point (AP), the method further comprising:
   at the first device, transmitting, to the AP, a request for resources for the D2D communication; and
   at the first device, receiving, from the AP, an allocation of resources for the D2D communication.

7. The method of claim 1, wherein the first device is a receiver for the D2D communication, wherein the first device receives the third communication from the second device subsequent to the first device transmitting the second communication to the second device.

8. The method of claim 7, wherein the first device is not associated with an access point (AP), the method further comprising:
   at the first device, prior to receiving the third communication, transmitting a fourth communication to the second device, wherein the fourth communication provides information for the second device to determine a preferred first device transmit sector to be used by the first device for the D2D communication.

9. A first device for device-to-device (D2D) communication with a second device, the first device comprising a processing device executing instructions to cause the first device to:
   receive a first communication transmitted by the second device, where the first communication is intended for another recipient other than the first device and the first device is not an intended recipient of the first communication, wherein the first device is caused to use information obtained from the first communication to determine a preferred second device transmit sector to be used by the second device for the D2D communication;
   transmit a second communication to the second device, the second communication providing information identifying the preferred second device transmit sector to be used by the second device for the D2D communication; and
   engage in the D2D communication with the second device by performing at least one of:
receiving data from the second device, the data having been transmitted by the second device on the preferred second device transmit sector; or
transmitting data to the second device, the data being transmitted by the first device on a preferred first device transmit sector identified in a third communication received from the second device.

10. The first device of claim 9, wherein the first communication is a sector sweep (SSW) frame transmitted by the second device, the SSW frame providing information identifying a sector on which the SSW frame was transmitted.

11. The first device of claim 10, wherein the preferred second device transmit sector is determined by:
   calculating a signal-to-noise ratio (SNR) ratio for each of a plurality of received SSW frames; and
   identifying the sector on which the SSW frame having the highest SNR was transmitted.

12. The first device of claim 9, wherein the second communication is a feedback frame providing information identifying the preferred second device transmit sector.

13. The first device of claim 9, wherein the first device is a transmitter for the D2D communication, wherein the first device receives the third communication from the second device prior to the first device transmitting the second communication to the second device.

14. The first device of claim 13, wherein the first device is associated with an access point (AP), wherein the processing device further executes instructions to cause the first device to:
   transmit, to the AP, a request for resources for the D2D communication; and
   receive, from the AP, an allocation of resources for the D2D communication.

15. The first device of claim 9, wherein the first device is a receiver for the D2D communication, wherein the first device receives the third communication from the second device subsequent to the first device transmitting the second communication to the second device.

16. The first device of claim 15, wherein the first device is not associated with an access point (AP), wherein the processing device further executes instructions to cause the first device to:
   prior to receiving the third communication, transmit a fourth communication to the second device, wherein the fourth communication provides information for the second device to determine a preferred first device transmit sector to be used by the first device for the D2D communication.

17. A non-transitory computer readable medium comprising a memory storing thereon computer executable instructions for device-to-device (D2D) communication between a first device and a second device, wherein the instructions, when executed by the first device, cause the first device to:
   receive a first communication transmitted by the second device, where the first communication is intended for another recipient other than the first device and the first device is not an intended recipient of the first communication, wherein the instructions cause the first device to use information obtained from the first communication to determine a preferred second device transmit sector to be used by the second device for the D2D communication;
   transmit a second communication to the second device, the second communication providing information identifying the preferred second device transmit sector to be used by the second device for the D2D communication; and
   engage in the D2D communication with the second device by performing at least one of:

receiving data from the second device, the data having been transmitted by the second device on the preferred second device transmit sector; or transmitting data to the second device, the data being transmitted by the first device on a preferred first device transmit sector identified in a third communication received from the second device.

18. The non-transitory computer readable medium of claim 17, wherein the first communication is a sector sweep (SSW) frame transmitted by the second device, the SSW frame providing information identifying a sector on which the SSW frame was transmitted.

19. The non-transitory computer readable medium of claim 17, wherein the first device is a transmitter for the D2D communication and the first device is associated with an access point (AP), wherein the instructions further cause the first device to:
　　transmit, to the AP, a request for resources for the D2D communication; and
　　receive, from the AP, an allocation of resources for the D2D communication.

20. The non-transitory computer readable medium of claim 17, wherein the first device is a receiver for the D2D communication and the first device is not associated with an access point (AP), wherein the instructions further cause the first device to:
　　prior to receiving the third communication, transmit a fourth communication to the second device, wherein the fourth communication provides information for the second device to determine a preferred first device transmit sector to be used by the first device for the D2D communication.

\* \* \* \* \*